US008005305B2

(12) United States Patent
Sibade et al.

(10) Patent No.: US 8,005,305 B2
(45) Date of Patent: Aug. 23, 2011

(54) METHOD AND APPARATUS FOR GENERATING A HALFTONED IMAGE FROM A COMPRESSED IMAGE

(75) Inventors: Cédric Sibade, Alfortville (FR); Stéphane Berche, Paris (FR)

(73) Assignee: Oce-Technologies B.V., Venlo (NL)

( * ) Notice: Subject to any disclaimer, the term of this patent is extended or adjusted under 35 U.S.C. 154(b) by 1457 days.

(21) Appl. No.: 10/866,867

(22) Filed: Jun. 15, 2004

(65) Prior Publication Data

US 2005/0008235 A1    Jan. 13, 2005

(30) Foreign Application Priority Data

Jun. 16, 2003  (EP) .................................. 03291446

(51) Int. Cl.
*G06K 9/36*       (2006.01)
*G06K 15/00*    (2006.01)

(52) U.S. Cl. ........ 382/233; 382/246; 382/250; 382/251; 358/3.03

(58) Field of Classification Search .................. 382/223; 358/3.03
See application file for complete search history.

(56) References Cited

U.S. PATENT DOCUMENTS

| | | | | |
|---|---|---|---|---|
| 4,766,499 A | * | 8/1988 | Inuzuka | .................. 358/426.13 |
| 5,339,164 A | * | 8/1994 | Lim | ......................... 358/426.02 |
| 5,369,502 A | * | 11/1994 | Fukuda et al. | ........... 358/426.12 |
| 5,416,854 A | * | 5/1995 | Fukuda et al. | ................ 382/232 |
| 6,584,225 B1 | * | 6/2003 | Moroney | ...................... 382/235 |
| 2003/0020835 A1 | * | 1/2003 | Petrescu | ....................... 348/625 |
| 2003/0210753 A1 | * | 11/2003 | Kuo et al. | ..................... 375/341 |

FOREIGN PATENT DOCUMENTS

| | | |
|---|---|---|
| EP | 1 102 209 A2 | 5/2001 |
| GB | EP 0 525 981 A | 2/1993 |
| JP | 2002-10085 A | 1/2002 |
| WO | 94/22108 A1 | 9/1994 |
| WO | WO 9422108 A1 * | 9/1994 |
| WO | 00/59209 A1 | 10/2000 |

OTHER PUBLICATIONS

Lee B-Y et al., Signal Processing, Amsterdam, NL, vol. 80, No. 12, Dec. 2000, pp. 2617-2621.
Gregory K. Wallace, Communication of the ACM/ Apr. 1991/vol. 34, No. 4.

* cited by examiner

*Primary Examiner* — John W Lee
(74) *Attorney, Agent, or Firm* — Birch, Stewart, Kolasch & Birch, LLP

(57) ABSTRACT

A method and apparatus are provided for generating a halftoned image from an image compressed by a domain transformation yielding coefficients for resulting domain components and by a coding operation by which these coefficients are coded. The method includes performing a decoding operation by which decoded coefficients ($y_p$) are obtained and performing a thresholding operation by which a bitmap is obtained, wherein only certain decoded coefficients ($y_p$) verifying a selection criterion are selected and taken into account in the thresholding operation.

17 Claims, 3 Drawing Sheets

METHOD AND APPARATUS FOR GENERATING A HALFTONED IMAGE FROM A COMPRESSED IMAGE

The present application claims, under 35 U.S.C. §119, the priority benefit of European Patent Application No. 03291446.7 filed Jun. 16, 2003, the entire contents of which are herein fully incorporated by reference.

BACKGROUND OF THE INVENTION

1. Field of the Invention

The invention relates to a method of generating a halftoned image from an image compressed by a domain transformation yielding coefficients for resulting domain components and by a coding operation by which these coefficients are coded, wherein the method includes a decoding operation by which decoded coefficients ($y_p$) are obtained and a thresholding operation by which a bitmap is obtained.

2. Discussion of the Related Art

Image compression technology offers valuable solutions to the problems of high storage or transmission costs. It is widely used in the areas of scanners, printers, facsimile, desktop publishing, medical imaging, graphic arts and many other continuous-tone or colour image applications. As a result of compression, the stream of data becomes shorter and thus, it is better transferred, stored and managed.

Many compression algorithms exist, for example, TIFF CCITT, JBIG and JPEG. JPEG (Joint Photographic Experts Group) has developed a general-purpose compression standard that meets the needs of many continuous-tone image applications. A detailed description is available in Communications of the ACM, 34, p 31 (1991), by G. K. Wallace. JPEG is based on the compression of an image converted firstly in the frequency domain. Source image samples are first grouped in 8×8 blocks. Then the input raw pixel representation is modified, using for example a frequency domain transform like the Discrete Cosine Transform (DCT). So-called DCT coefficients are obtained, which coefficients can be regarded as the relative amounts of the 2D spatial frequencies contained in the 64-point input signal. The coefficient with zero frequency in both dimensions is called the 'DC coefficient' while the remaining 63 coefficients are called the 'AC coefficients'. The DCT coefficients are then quantized, i.e. each DCT coefficient is divided by its corresponding quantizer step size, followed by rounding to the nearest integer. The goal of this operation is to discard information which is not visually significant. This is the reason why quantization is fundamentally 'lossy'.

It is convenient to order the DCT coefficients in a zigzag sequence of an 8×8 array. In this zigzag sequence, the DC coefficient is coefficient with an index 0 and the higher frequency coefficients have a higher index. This ordering facilitates the next step of compression, being entropy coding, by placing the low-frequency coefficients before the high-frequency coefficients. The step of entropy coding achieves efficient compression by encoding the DCT coefficients more compactly based on their statistical characteristics. Examples of entropy coding methods are the Huffman coding and arithmetic coding.

A benefit from the compressed-domain image processing is the ability to decrease the requirements in terms of processing power. When wide format documents have to be printed, an operation that can be quite time-consuming is the halftoning step due to the large amount of data. In order to perform a print of a compressed image, for example, an image compressed in the JPEG format, the encoded data first have to be decoded. This can be done using a Huffman decoder, by which decoded DCT coefficients are obtained. This operation is followed by a de-quantization step. In order to retrieve the input pixel values, an inverse Discrete Cosine Transform is carried out. Halftoning, being the process of rendering colour or grey-scaled images into bitmaps, i.e. images which pixel values can only have two possible levels (print a dot or do not print a dot), can be performed on these retrieved input pixel values. Examples of well-known halftoning methods are the error diffusion method and the masking method. In the masking method, the halftoning operation is a simple thresholding of an image with a mask that can have different threshold values which are organized in a matrix array. For the sake of efficiency, however, the image processing operations have to be adapted to be performed on the compressed stream of data. This is particularly relevant for wide format documents, because the gain in processing time may be significant.

An image processing operation performed on the compressed stream of data is disclosed for example in PCT Application Publication No. WO 94/22108. According to the method of generating thumbnail or reduced size images disclosed in that document, the images are generated based on the DC values of the DCT coefficients. A Huffman decoder is used to decode the compressed image data, by which quantized DCT coefficients are generated. The steps of de-quantization and of inverse DCT on the AC coefficients are skipped. Only DC coefficients are used to generate an image having a reduced size. In other words, the thumbnail image is built out of the DC values of each 8×8 block. Thus, the process time needed to render the image is reduced, and the user is enabled to quickly browse various images. This method, however, when applied to generating a halftoned image from a compressed image, has the disadvantage that the quality of the rendered details in the printed image is much too low and does not meet the requirements of the user.

SUMMARY OF THE INVENTION

The present invention seeks to provide a method of generating a halftoned image from an image compressed by a domain transformation in which the problems of the related art are mitigated.

According to the method of the invention, only decoded coefficients ($y_p$) verifying a selection criterion are selected and taken into account in the thresholding operation.

The main benefit of the method of generating a halftoned image from an image compressed by a domain transformation according to the invention is that a rapid halftoning can be obtained while the visual quality of the halftoned image is good. The halftoning operation is relatively rapid because not all decoded coefficients are taken into account in the thresholding operation. The visual aspect of the halftone image when printed is satisfying and the details of the image are rendered properly since the result of the thresholding operation is essentially the same as it would be when all decoded coefficients were taken into account.

The invention particularly provides a method of generating a halftoned image from a compressed image wherein the decoded coefficients ($y_p$) are discrete cosine transform (DCT) coefficients. This embodiment according to the invention is particularly interesting because, in the case of JPEG compression, the most important part of the processing is performed in the Discrete Cosine Transform. If such a JPEG compressed image had to be fully uncompressed, the step of inverse Discrete Cosine Transform would have to be performed. According to the invention, the step of transforming the decoded coefficients ($y_p$) back into input pixels is skipped.

When the decoded coefficients ($y_p$) are DCT coefficients, generating a halftone image will effectively benefit from skipping the inverse DCT and processing time will be gained.

According to one aspect of the present invention, the decoded coefficients ($y_p$) selected for the thresholding operation are the DC coefficient ($y_0$) and only the AC coefficients in absolute value equal to or larger than a pre-determined value LIM. The DC coefficient $y_0$ is important since it gives the mean (average) tone of a block of input pixels. Some AC coefficients ($y_p$) do not change significantly the result of the thresholding operation performed to obtain a halftoned image. The pre-determined value LIM is the lowest boundary for the absolute value of the AC coefficients ($y_p$) that are taken into account for the thresholding operation. Each of the coefficients ($y_p$) equal to or larger in absolute value than LIM may have a significant influence on the result of the thresholding operation.

It is preferred that variables used in the thresholding operation of the present invention are pre-calculated. Then, even more processing-time can be gained.

In one embodiment of the method of generating a halftoned image from an image compressed by a domain transformation according to the invention, the decoded coefficients ($y_p$) selected for the thresholding operation are amplified by a factor $\alpha$. This leads to a lowering of the noise that may be created by the halftoning operation. In particular, edges are enhanced and noisy lines can be avoided.

The invention also provides an apparatus for generating a halftoned image from an image compressed by a domain transformation yielding coefficients for resulting domain components and by a coding operation by which these coefficients are coded, comprising a decoder for performing a decoding operation by which decoded coefficients ($y_p$) are obtained and a halftoning module for performing a thresholding operation by which a bitmap is obtained. The apparatus is also provided with a memory for storing a digital compressed image and a processing unit for processing digital data, wherein the halftoning module performs the thresholding operation in accordance with the method of the invention.

The invention further provides a computer program with a program code for generating a halftoned image from an image compressed by a domain transformation in accordance with the method of the invention. This program can reside in the decoder, the halftoning module and/or other parts of the present apparatus. It can also be stored on recording mediums such as discs.

The invention provides also a printer provided with a network connection unit for receiving externally generated print orders, a processing unit for processing digital image data and a printing unit. The processing unit is provided with an apparatus wherein the method of generating a halftoned image from an image compressed by a domain transformation according to the invention is applied.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will now be explained with reference to the following exemplified embodiment of the present invention, and illustrated by reference to the drawings. This embodiment serves to illustrate the invention and should not be regarded as a limitation thereof.

DETAILED DESCRIPTION OF THE PREFERRED EMBODIMENTS

An embodiment of the method of generating a halftoned image from an image compressed by a domain transformation is explained hereinafter for a continuous tone image such as a grey level image. It is also possible to apply this method in order to halftone a compressed colour image. When the colour image is to be printed by a colour printer such as an ink-jet printer using a number of colorants (for example black, cyan, magenta and yellow in the form of ink), the corresponding halftoned image is characterized by the same number of colour planes. Each colour plane is a continuous-tone image and is independently transformed into a bitmap using the method described hereinafter. To avoid artifacts and Moiré patterns, different masks should be used for each colour component and different orientations have to be given to these masks.

Figure 1:
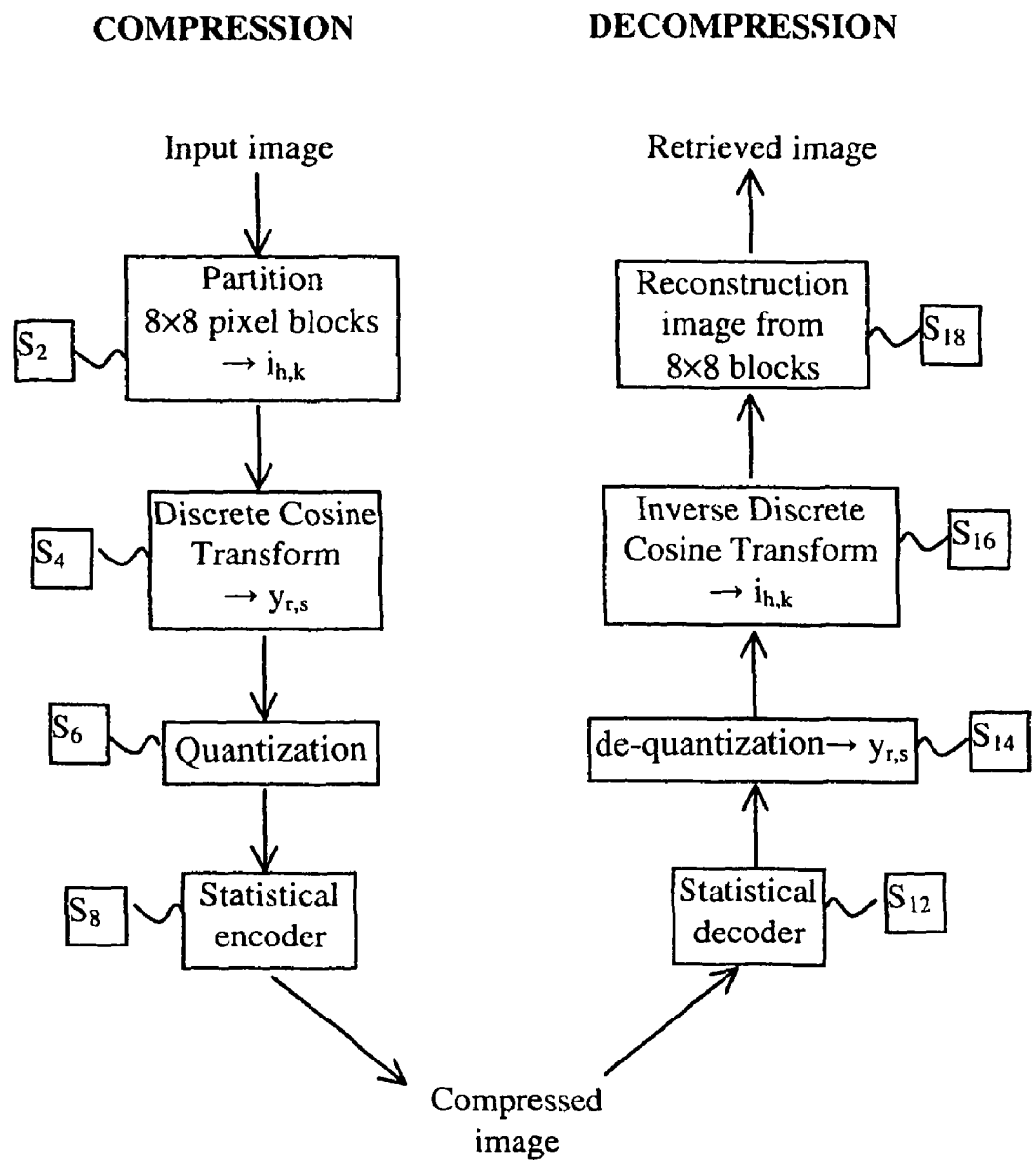
FIG. 1 illustrates a general compression and decompression framework.

First, the general framework of compression and decompression of an image is given. The principles of compression and decompression are summarized in FIG. 1. Referring to FIG. 1, at the input of a compression algorithm, the source image samples are grouped into 8×8 blocks ($S_2$), representing for example pixels values within the range [$-2^{N-1}$, $2^{N-1}-1$] (signed integers). Such an 8×8 block is a matrix I with 64 coefficients $i_{h,k}$, with h taking the integer values 0, ..., 7 and k taking the integer values 0, ..., 7. The following step ($S_4$) of a compression algorithm is for example a Discrete Cosine Transform (DCT) by which the coefficients $i_{h,k}$ are transformed into coefficients $y_{r,s}$, according to the following equation (1):

$$y_{r,s} = \frac{1}{4} C(r)C(s) \sum_{h=0}^{7} \sum_{k=0}^{7} \cos\left(\frac{(2h+1)r}{16}\pi\right) \cos\left(\frac{(2k+1)s}{16}\pi\right) i_{h,k} \quad (1)$$

with $C(r)$, $C(s)=1/\sqrt{2}$ for r, s=0; and $C(r)$, $C(s)=1$ otherwise.

Each of the 64 DCT coefficient $y_{r,s}$, forming the matrix Y, contains one of the 64 unique two-dimensional spatial frequencies of which the input signal's spectrum is made. The DCT coefficient with zero frequency in both dimensions is called the DC coefficient. The remaining 63 DCT coefficients are called the AC coefficients. The quantization step ($S_6$) aims at discarding information which is not visually significant. Quantization is a many-to-one mapping and it is therefore fundamentally 'lossy'. To perform quantization, a 64-element quantization matrix Q having coefficients $q_{r,s}$ must be specified by the application. The highest frequency components contain the fine details of the image, to which the human vision is generally less sensitive. The highest frequency components can therefore be quantized more coarsely than the other components without significant degradation of the image quality. The quantization operation is performed on the DCT coefficients $y_{r,s}$. A quantized 8×8 block of $y_{r,s}^q$ coefficients is obtained by dividing each of the DCT coefficients by its corresponding quantizer step size $q_{r,s}$, followed by rounding to the nearest integer according to the following equation (2):

$$y_{r,s}^q = \text{Integer Round}\left(\frac{y_{r,s}}{q_{r,s}}\right) \quad (2)$$

This quantization stage is fundamentally 'lossy' due to the rounding operation. The index q, indicating that the coefficients have been quantized, may now be left out, keeping in mind that the coefficients may however be quantized.

The next step to be performed when compressing an image is the step of entropy coding (see the step $S_8$ in FIG. 1). In order to facilitate this coding, the coefficients $y_{r,s}$ are ordered into a zigzag sequence by placing the low-frequency coefficients, being more likely to be nonzero, before high-frequency coefficients. The DCT coefficient with zero frequency (r=0; s=0) in both dimensions is called the DC coefficient and the remaining coefficients of the block are called the AC coefficients. The DC coefficient is proportional to the mean (average) value of the block $i_{k,h}$. As r and s are increasing in both dimensions, the cosine frequency is also increasing. Now that the coefficients $y_{r,s}$ are ordered in a zigzag sequence, a single index p, rather than (r,s) can be used for the DCT coefficients, which is expressed as $(y_p)$ with p=0, ..., 63. In this notation, $y_0$ is the DC coefficient. The notation $y_p$ is equivalent to the notation $y_{r,s}$.

The entropy coding ($S_8$) leads to compression by encoding the DCT coefficients more compactly based on their statistical characteristics. Examples of entropy coding methods are Huffman coding and the arithmetic coding. These methods are specified by the JPEG proposal. Encoding basically assigns codewords with a variable size in function of the occurrence frequency of the symbol. Huffman coding requires tables to be specified by the application. The compressed file has for example a format in accordance with the JPEG proposal.

A general decompression algorithm is also indicated in FIG. 1, and comprises the steps of decoding ($S_{12}$), de-quantization ($S_{14}$), inverse Discrete Cosine Transform ($S_{16}$) and reconstruction of the image ($S_{18}$). The same tables used to compress an image are needed to decompress it, using for example a Huffman decoder ($S_{12}$). Since the ($y_p$) coefficients had been quantized in a compression framework, e.g., as discussed above, a de-quantization operation ($S_{14}$) has to be performed in order to obtain the non-quantized coefficients. The de-quantization operation is performed according to the following equation (3):

$$y_p = y_{r,s}^q q_{r,s} \quad (3)$$

In order to retrieve the block I with 64 coefficients $i_{h,k}$, an inverse DCT operation is carried out ($S_{16}$). The Inverse DCT is expressed by the following equation (4):

$$i_{h,k} = \frac{1}{4}\sum_{r=0}^{7}\sum_{s=0}^{7} C(r)C(s)\cos\left(\frac{(2h+1)r}{16}\pi\right)\cos\left(\frac{(2k+1)s}{16}\pi\right)y_{r,s} \quad (4)$$

with C(r), C(s)=$1/\sqrt{2}$ for r, s=0; and C(r), C(s)=1 otherwise.

Instead of using the two index h and k, the index d is used in the rest of the description, with d taking the values d=0, ..., 63. The inverse DCT can then be written as:

$$i_{h,k} = i_d \approx \sum_{p=0}^{63} y_p F_{DCT_p}^d \text{ where} \quad (5)$$

$$F_{DCT_p}^d = F_{DCT_{r,s}}^{h,k}$$
$$= \frac{1}{4}C(r)C(s)\cos\left(\frac{(2h+1)r}{16}\right)\cos\left(\frac{(2k+1)s}{16}\right)$$

with p corresponding to (r,s) and d corresponding to (h,k). The image can now be reconstructed ($S_{18}$) and be further processed.

Figure 2:
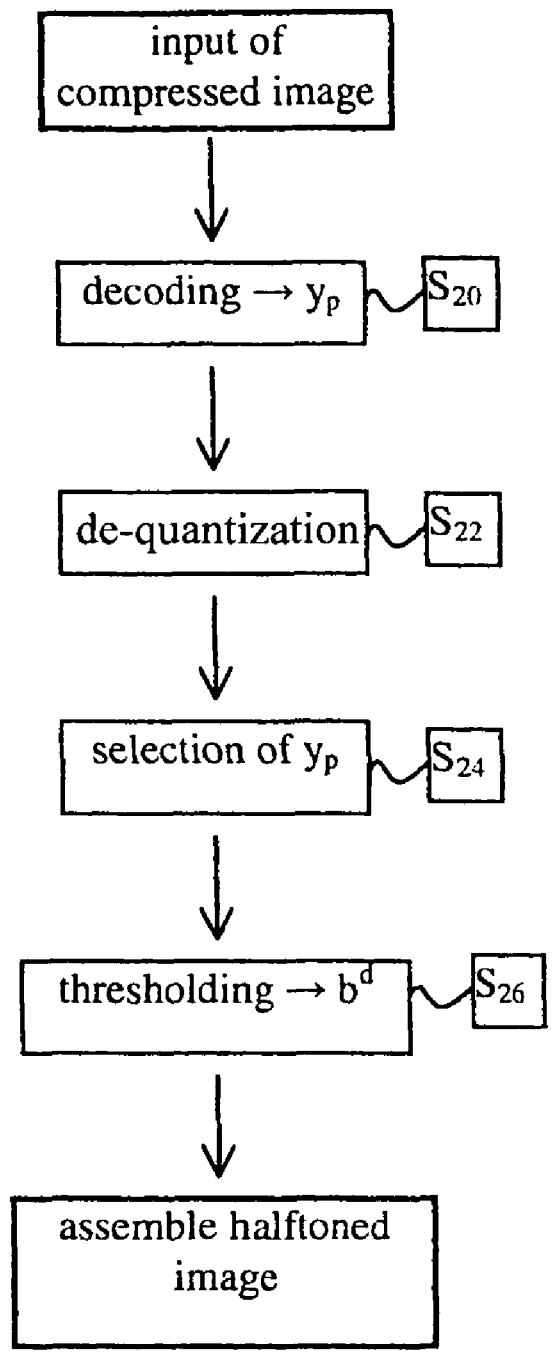
FIG. 2 is a flow diagram for a method of generating a halftoned image according to an embodiment of the invention.

The method of generating a halftoned image from an image compressed by a domain transformation according to the invention is now explained according to the flow diagram of FIG. 2. Referring to FIG. 2, the method comprises a decoding operation ($S_{20}$) by which decoded coefficients ($y_p$) are obtained. For example, in the case of a JPEG compressed image, the DCT coefficients ($y_p$), which had been coded within a compression framework, are retrieved. Due to the 'lossy' characteristic of quantization, the decoded coefficients are approximately equal to the coded coefficients.

As explained above, the step ($S_{22}$) performs a de-quantization operation, and the coefficients obtained are indicated by the same notation ($y_p$).

The method of generating a halftoned image from an image compressed by a domain transformation according to the invention further comprises a thresholding operation ($S_{26}$) by which a bitmap is obtained. An example of a halftoning operation is the masking method. Given an input image comprising a block I with $i_{h,k}$ being a pixel placed at line h, column k, and given a pixel matrix M of a mask, with $m_{h,k}$ being the matrix elements, the basic halftoning operation aims at creating an output bitmap matrix B with elements $b_{h,k}$. The thresholding operation with a mask can be written as follows:

B=I⊗M with $b_{h,k}$=1 if $i_{h,k} \geq m_{h,k}$ and $b_{h,k}$=0 otherwise.

One important characteristic of the mask is its spectral property. Some masks tend to have blue noise or green noise. The common approach is to work with masks having a fixed size, and to apply a mask as non-overlapping tiles on the different parts of an image. Common mask sizes are 128×128 or 256×256 pixels.

Assuming that the mask size is 8×8, or that the 8×8 mask matrix is a portion of a mask with larger size, and using the index d instead of h and k, with d=0, ... 63, the thresholding operation can now be expressed as:

B=I⊗M with $b_d$=1 if $i_s > m_d$ and $b_d$=0 otherwise, or, almost equivalently (because of the 'lossy' rounding operation of the quantization), $B = I \otimes M$ with $b_d = 1$ if $i_d \approx \sum_{p=0}^{63} y_p F_{DCT_p}^d \geq m^d$ and $b_d = 0$ otherwise.

According to the invention, only certain decoded coefficients ($y_p$) verifying a selection criterion are selected and taken into account ($S_{24}$) in the thresholding operation ($S_{26}$). Some ($y_p$) should have no significant influence on the result of the thresholding operation ($S_{26}$) done for the pixel $i_d$ by evaluating the sum $$\sum_{p=0}^{63} y_p \, F_{DCT_p}^d$$

and comparing it to $m_d$. Not taking into account these coefficients ($y_p$) leads to good results, with a satisfying quality for the output bitmap matrix B and a significant gain in processing time. $S_{24}$ is the step of selecting the coefficients $y_p$ according to a criterion, specifying which coefficients are taken into account in the thresholding operation of the step $S_{26}$.

The DC coefficient $y_0$ is important since it gives the mean tone of the block, and is preferably taken into account in the thresholding operation, which can also be expressed by the following mathematical expression (6):

$$\sum_{p=1}^{63} y_p F_{DCT_p}^d \geq m_d - y_0 \qquad (6)$$

Thus, the DC coefficient $y_0$ is selected and to make the selection ($S_{24}$) of the other coefficients ($y_p$) it is preferred to take into account only the AC coefficients ($y_p$) of which the absolute value is equal to or larger than a pre-determined value LIM. As mentioned above, the LIM is the lowest boundary for the absolute value of the AC coefficients ($y_p$) that are taken into account for the thresholding operation. For example, the decoded coefficients ($y_p$) with the value −1 or 1 will not change the result of the thresholding operation as much as the coefficients ($y_p$) with the value 8 or −14, which are then selected in the step $S_{24}$.

The pre-determined value of LIM may be a fixed value for all images. It may also be a value that can be determined by the user and entered to by means of a user interface. It is also possible to determine the value of LIM adaptatively. In this adaptative mode, the so-called energy of a block, being for example the sum of all AC coefficients ($y_p$), is calculated for each block. The value of LIM may be a function of the calculated block energy.

In order to increase further the processing speed for generating a halftoned image, some parts of the variables used in the thresholding operation ($S_{26}$) can be pre-calculated, for example, the right part ($m_d - y_0$) of the expression (6) above and the variables $y_p \, F_{DCT_p}^d$ can be pre-calculated. These pre-calculated variables can be put in a memory in the form of a table.

It is also possible to enhance the edges of an image within the frame of the method of generating a halftoned image from an image compressed by a domain transformation according to the invention. This has the advantage that noise on the halftoning of lines is significantly reduced. After having obtained the decoded coefficients ($y_p$), the left part of the expression (6) used for the thresholding operation is multiplied by a factor α, which can be a fixed factor, or be chosen by the user, or be determined by an adaptative mode in the same way as explained above for LIM. The expression used for the thresholding operation then becomes the following:

$$\sum_{p=1}^{63} \alpha \, y_p \, F_{DCT_p}^d \geq m_d - y_0 \qquad (7)$$

Figure 3:
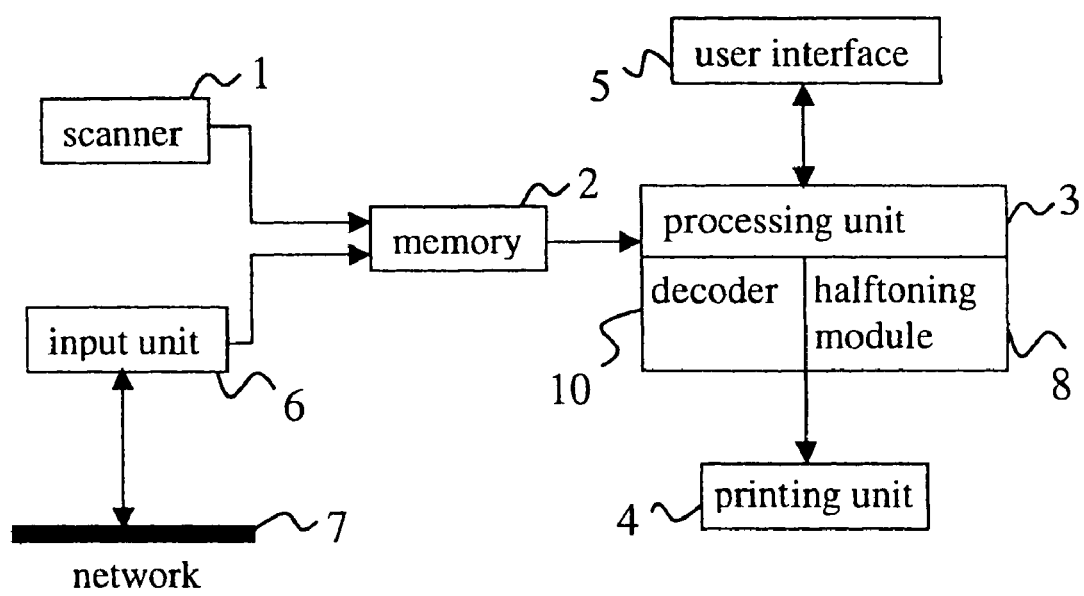
FIG. 3 is a block diagram of a digital printer usable in the present invention.

FIG. 3 shows a diagrammatic representation of the most important parts of a digital printer to which the invention as described above is applied.

Referring to FIG. 3, this apparatus is provided with a user interface (operating unit) 5 and an input unit 6 for receiving digital images made elsewhere, e.g. via a network 7, so that the apparatus is used as a printer.

The apparatus is also provided with a scanner 1 having a device for converting a recorded image to a digital image, a memory 2 for storing the digital image, for example a compressed JPEG image, a processing unit 3 for processing the digital image, and a printing unit 4 for printing the processed digital image on paper or any suitable medium. All the components of this apparatus are operatively coupled. For printing digital colour images, the printing unit 4 contains a number of colour printing sub-units, each printing a basis colour. For example, four colour printing sub-units can use the basis colorants cyan, yellow, magenta and black in the form of ink or toner. Colours are rendered with halftoning techniques such as masking or error diffusion methods.

The input image originating from the scanner 1 or the input unit 6 is a continuous-tone image or a colour image. In the case of a colour image, each colour plane is a continuous-tone image and is independently transformed into a bitmap using the method according to the invention. In order to perform the halftoning operation, the processing unit 3 is provided with a decoder 10 for performing a decoding operation by which decoded coefficients ($y_p$) are obtained and a halftoning module 8 for performing a thresholding operation according to the invention.

The processing unit 3 is connected to the operating unit 5 being the user/operator interface. The operator interface 5 comprises selection means and may possibly be provided with setting means for setting some parameters of the halftoning function, for example by means of a slide or button. For example, the parameters could be chosen when it is desired to enhance the edges of an image and to reduce the noise on the halftoning of the lines. In the memory 2, it is possible to store some pre-calculated variables used in the thresholding operation.

When the invention is used in a printer in a network environment, the user can, for example, indicate by means of the printer driver at his workstation that a chosen image must be halftoned with chosen parameters. In that case, a processing device in the printer generates a halftone image from a compressed image, and prints the converted image.

It is also possible to carry out the present halftoning operation in a separate computer, for example the workstation of a user, and then send the halftoned digital image to a printer or store it in a mass memory.

The processing steps of the present invention are implementable using existing computer programming language. Such computer program(s) may be stored in memories such as RAM, ROM, PROM, etc. associated with computers. Alternatively, such computer program(s) may be stored in a different storage medium such as a magnetic disc, optical disc, magneto-optical disc, etc. Such computer program(s) may also take the form of a signal propagating across the Internet, extranet, intranet or other network and arriving at the destination device for storage and implementation. The computer programs are readable using a known computer or computer-based device.

Although the invention has been explained by reference to the above-described exemplified embodiments, it is not limited thereto. It will be clear to the skilled person that other embodiments are possible within the scope of the claims.

The invention claimed is:

1. A method of generating a halftoned image in a computerized digital image forming apparatus in which pixel values can have only two possible levels from an image compressed by domain transformation yielding coefficients for resulting domain components and by a coding operation by which said coefficients are coded, the method comprising:
performing a decoding operation on the compressed image by which a decoded DC coefficient and decoded AC coefficients ($y_p$) are obtained, wherein the decoded coefficients are not transferred back into input pixels;
selecting the decoded DC coefficient;
selecting decoded AC coefficients ($y_p$) having an absolute value equal to or larger than a predetermined value; and
generating the halftoned image by performing a thresholding operation to obtain a bitmap using only the selected decoded DC coefficient and the selected decoded AC coefficients, wherein the thresholding operation is expressed by:

$$b^d = 1 \text{ if } \sum_{p=1}^{63} y_p FDCT_p^d \geq m_d - y_0, \text{ else } b^d = 0,$$

where $b^d$ is an element of the output bitmap for a pixel with index d, $m_d$ is a threshold level for a pixel with index d; $y_0$ is the decoded DC coefficient; $y_p$ are the decoded AC coefficients, and $FDCT_p^d$ are inverse domain transformation coefficients, and
wherein the quality of the halftoned image is dependent on the selected decoded coefficient.

2. The method of generating a halftoned image according to claim 1, wherein in the decoding operation, the decoded coefficients ($y_p$) are discrete cosine transform (DCT) coefficient and $FDCT_p^d$ are inverse DCT coefficients.

3. The method of generating a halftoned image according to claim 2, wherein the variables, $y_p$ and $FDCT_p^d$ used in the thresholding operation are pre-calculated.

4. The method of generating a halftoned image according to claim 1, wherein in the decoding operation, the decoded coefficients ($y_p$) are obtained using a Huffman decoder.

5. The method of generating a halftoned image according to claim 1, wherein the decoded coefficients ($y_p$) selected for the thresholding operation are amplified by a factor α.

6. A computerized apparatus for generating a halftoned image from a digital image compressed by domain transformation yielding coefficients for resulting domain components and by a coding operation by which said coefficients are coded, the apparatus comprising:
an input device for inputting the digital image into the computerized apparatus;
a decoder for performing a decoding operation by which a decoded DC coefficient and decoded AC coefficients ($y_p$) are obtained, wherein the decoded coefficients are not transferred back into input pixels;
a computerized element for selecting said decoded DC coefficient and for selecting decoded AC coefficients having an absolute value equal or larger than a predetermined value;
a halftoning module for generating, the halftoned image by performing a thresholding operation to obtain a bitmap using only the selected decoded DC coefficient and the selected decoded AC coefficients, wherein the thresholding operation is expressed by:

$$b^d = 1 \text{ if } \sum_{p=1}^{63} y_p FDCT_p^d \geq m_d - y_0, \text{ else } b^d = 0,$$

where $b^d$ is an element of the output bitmap for a pixel with index d, $m_d$ is a threshold level for a pixel with index d; $y_0$ is the decoded DC coefficient; $y_p$ are the decoded AC coefficients, and $FDCT_p^d$ are inverse domain transformation coefficients, and
wherein the quality of the halftoned image is dependent on the selected decoded coefficient;
a memory for storing the digital compressed image; and
a processing unit for processing digital data including data from the memory.

7. The apparatus for generating a halftoned image according to claim 6, wherein the decoder is a Huffman decoder.

8. The apparatus for generating a halftoned image according to claim 6, further comprising:
a memory for storing pre-calculated values used in the thresholding operation.

9. The apparatus for generating a halftoned image according to claim 6, wherein the apparatus is a printer.

10. The apparatus for generating a halftoned image according to claim 9, further comprising:
a network connection unit for receiving externally generated print orders.

11. The apparatus for generating a halftoned image according to claim 6, wherein in the decoding operation, the decoded coefficients ($y_p$) are discrete cosine transform (DCT) coefficients.

12. The apparatus for generating a halftoned image according to claim 6, wherein the decoded coefficients ($y_p$) selected for the thresholding operation are amplified by a factor α.

13. A non-transitory computer-readable storage medium embodying a computer program product thereon, for generating a halftoned image from an image compressed by domain transformation yielding coefficients for resulting domain components and by a coding operation by which said coefficients are coded, the computer program product comprising computer-executable instructions for:
performing a decoding operation by which a decoded DC coefficient and decoded AC coefficients ($y_p$) are obtained, wherein the decoded coefficients ($y_p$) are not transferred back into input pixels;
selecting the decoded DC coefficient;
selecting decoded AC coefficients having an absolute value equal or larger than a predetermined value; and
generating the halftoned image by performing a thresholding operation to obtain a bitmap using only the selected decoded DC and the selected decoded AC coefficients, wherein the threshold operation is expressed by:

$$b^d = 1 \text{ if } \sum_{p=1}^{63} y_p FDCT_p^d \geq m_d - y_0, \text{ else } b^d = 0,$$

where $b^d$ is an element of the output bitmap for a pixel with index d, $m_d$ is a threshold level for a pixel with index d; $y_0$ is the decoded DC coefficient; $y_p$ are the decoded AC coefficients, and $FDCT_p^d$ are inverse domain transformation coefficients, and
wherein the quality of the halftoned image is dependent on the selected decoded coefficient.

14. The non-transitory computer-readable storage medium according to claim 13, wherein in the decoding operation, the decoded coefficients ($y_p$) are discrete cosine transform (DCT) coefficients and $FDCT_p^d$ are inverse DCT coefficients.

15. The non-transitory computer-readable storage medium according to claim 14, wherein variables used in the thresholding operation are pre-calculated.

16. The non-transitory computer-readable storage medium tangible storage medium according to claim 13, wherein the computer-executable instructions for performing the decoding operation are implemented using a Huffman decoder.

17. The non-transitory computer-readable storage medium storage medium according to claim 13, wherein the decoded coefficients ($y_p$) selected for the thresholding operation are amplified by a factor $\alpha$.

* * * * *